March 21, 1933.   F. V. LARKIN   1,902,307
TESTING DEVICE
Filed July 16, 1928
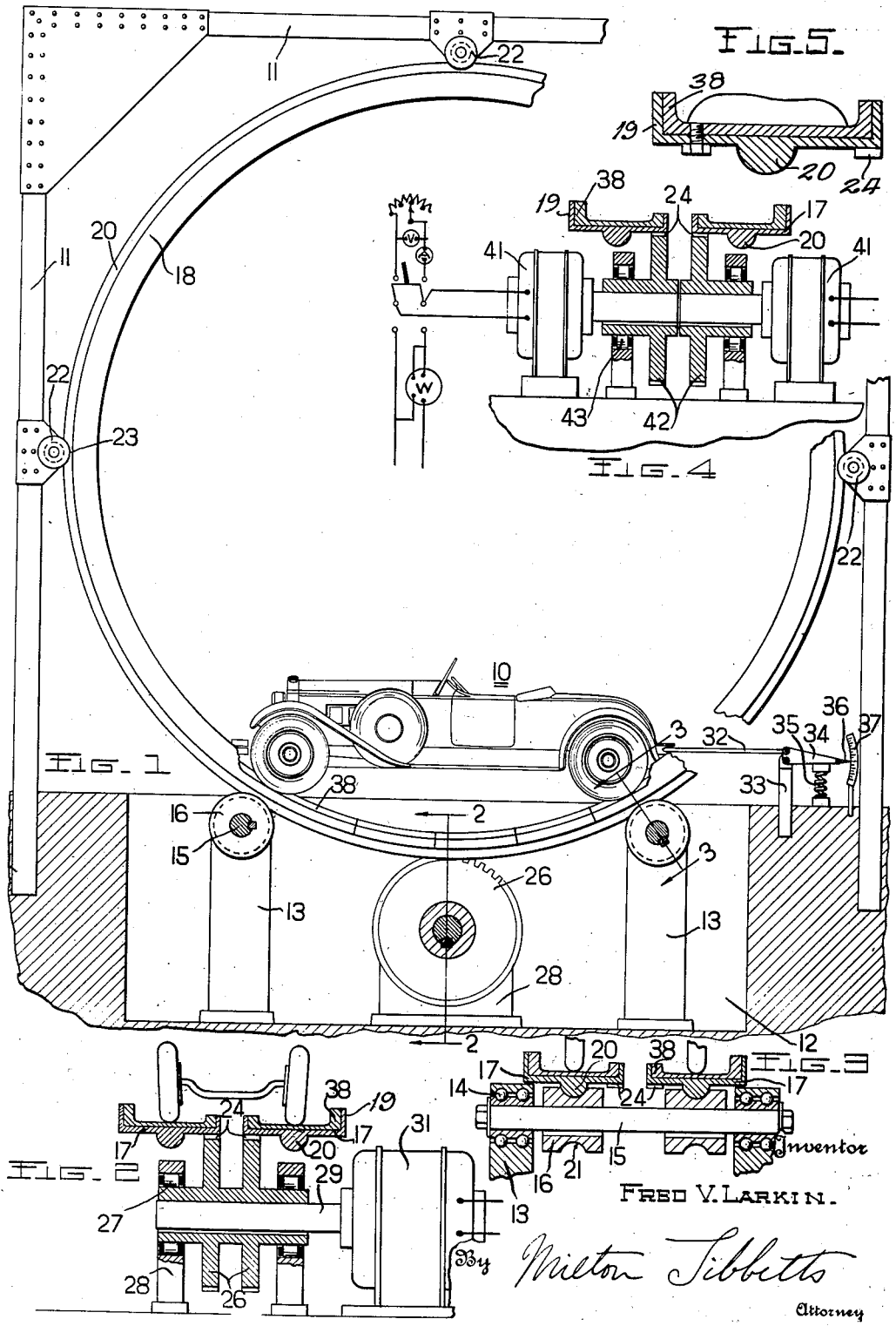

Patented Mar. 21, 1933

1,902,307

UNITED STATES PATENT OFFICE

FRED V. LARKIN, OF BETHLEHEM, PENNSYLVANIA

TESTING DEVICE

Application filed July 16, 1928. Serial No. 292,958.

This invention relates to testing devices and more particularly to devices for testing motor vehicles such as automobiles.

It has for one of its objects to provide simple, compact and safe means for testing a vehicle and its prime mover under actual running conditions without movement of the vehicle as a whole.

Another object of the invention is to provide a testing device adapted to furnish a running test of a stationary vehicle, and of the various elements of the vehicle such as the engine, transmission, brakes, tires, suspension, etc.

Another object of the invention is to provide means whereby a vehicle may be operated under any desired load and at any desired speed within its range without movement relative to the earth, for purposes of observation and testing.

Another object of the invention is to provide means to determine the draw bar pull and the coefficient of traction of a vehicle at various speeds and loads, and to determine the wearing properties of tires, and of various road surfaces.

Other objects of the invention will appear from the following description taken in connection with the drawing which forms a part of this specification, and in which:

Fig. 1 is a view in side elevation, partially in section and partially broken away, of a testing device embodying this invention;

Fig. 2 is a view in transverse section, substantially on the line 2—2 of Fig. 1;

Fig. 3 is a view in transverse section substantially on the line 3—3 of Fig. 1;

Fig. 4 is a view similar to Fig. 2, showing a modified form of the power measuring devices and the connecting gearing, and Fig. 5 is an enlarged section through one of the supporting rings showing one way in which the track liners may be secured to these rings.

The former method for testing motor vehicles by running them on the public highways has now become dangerous and impractical, especially at the higher speeds of which modern vehicles are capable, and the necessity for the testing of vehicles has led to the construction of private testing grounds or tracks, which are banked to permit high speeds and are sometimes provided with artificial hills or other devices to provide loads for the vehicles. Such testing grounds, however, are very expensive in construction and require a large space, so that it is ordinarily not possible to provide such facilities within convenient distance of the factory or shops in which the vehicles to be tested are made or repaired. Such testing methods are also inconvenient when used for endurance testing, or testing vehicles and their parts to destruction, because frequent stops must be made in the test for replenishment of supplies, such as fuel and lubricants, and to make observations of the conditions of the vehicle and the progress of the test.

It has been heretofore proposed to test motor vehicles by mounting them on a fixture, the wheels resting upon spaced friction rollers or drums to permit running operation without translatory movement over the ground. The present invention constitutes an improvement in devices of this nature, the advantages of which will subsequently appear.

In the accompanying drawing is shown a device for testing a motor vehicle such as indicated generally at 10, having a foundation adapted to support a frame 11, and provided with a depressed portion or pit 12. Within the pit 12 are spaced supports 13, shown in the present embodiment as posts, which are arranged in pairs and provided with pairs of aligned bearings 14, in which transverse supporting axles 15 are journaled. Each of these axles 15 is provided with a pair of spaced guiding and supporting rollers 16, rigidly secured to the axle 15, which rollers are adapted to support a pair of rings 17 of considerable diameter, arranged in parallel vertical planes to form a circular track 18, adapted to rotate on the rollers about a horizontal axis. It will be understood that the rings 17 are axially spaced a distance corresponding to the tread of the vehicles to be tested, so that the right hand wheels of the vehicle are supported on one of the rings and the left hand wheels on the other, as clearly shown in the drawing.

Each of the rings 17 is preferably of channel shape in cross section, having radially disposed flanges 19 acting as guides to prevent the vehicle wheels from leaving the track. Each ring is also provided with a circumferential rib 20 adapted to seat in a circular groove 21 on the rollers 16, whereby the rings are guided, these ribs also considerably strengthening the rings. The rings are also guided by suitable rollers 22, carried by the frame 11 at the top and sides thereof, and provided with grooves 23 cooperating with the ribs 20.

Each of the rings 17 is also provided with a circumferential rack 24, the teeth of which are adapted to mesh with the corresponding teeth of a pair of spur gears 26, rotatably mounted in suitable bearings 27 on a support 28 in the pit 12, these gears being keyed or otherwise rigidly connected to the shaft 29 of a suitable dynamometer or power measuring device 31.

The dynamometer 31 is indicated in the drawing as being of the dynamo-electric type, and comprises a dynamo-electric machine which may operate either as a generator or as a motor. It is to be understood that this machine may be connected at will to a suitable source of electrical energy for operation as a motor, or to a suitable variable resistance adapted to absorb the output of the machine when operating as a generator, and is provided with suitable indicating instruments, such as shown conventionally in Figs. 2 and 4, to measure the power input or output of the machine as the case may be. As dynamometers of this nature are well konwn in the art to which this invention relates, the specific construction thereof, and the circuits, controls and instruments connected thereto, have not been illustrated, but it is to be understood that any other suitable power measuring device, with means for imposing a braking load upon the track 18, may be used if desired.

The vehicle 10 is restrained from movement as a whole with respect to the frame 12, or the ground, by means of a draw bar or tension member 32 of any suitable construction which may be removably clamped to the vehicle, preferably to the frame thereof, and is connected at its other end to an anchor or post 33 fixed in the foundation of the device. Between the draw bar 32 and the anchor 33 is interposed suitable means for measuring the pull exerted by the vehicle on the anchor. This means may be of any desired construction, but it has been diagrammatically illustrated in the drawing as comprising a bell crank member 34 fulcrumed on the anchor 33 and having one arm connected to the draw bar 32 and the other arm connected to a spring 35. The other end of the spring is secured to the foundation. This device constitutes a spring balance, the deflection of which is proportional to the draw bar stress and this deflection may be conveniently measured by a suitable pointer 36 connected to the bell crank 34 to play over a fixed scale 37.

The rings 17 are preferably provided with liners 38, which may be segmental as indicated in Fig. 1, detachably secured thereto in any convenient manner, as indicated in Fig. 5 for example, and these liners may be formed of various paving materials such as brick, concrete, macadam, etc., thus affording a test of the wearing qualities of such materials as well as the wear of vehicle tires. The liners may also be formed with depressions and raised portions, as shown in Fig. 5, irregularly spaced to simulate bumps, holes and other obstructions such as are encountered in the actual driving of a vehicle, thus affording a running test which closely approximates actual driving conditions.

The operation of the device will be easily understood from the foregoing description. The vehicle to be tested is placed in position in the track 18 in any convenient manner, the vehicle wheels contacting the traction surfaces of the liners 38 and the draw bar 32 is connected to the vehicle to prevent movement thereof. In this position the vehicle is started, and this may be accomplished either by the usual engine starting mechanism built into the vehicle, or by cranking it through rotation of the track 18 by means of the dynamometer 31, the latter operating as a motor. After starting, the vehicle is run in any desired manner to obtain the results sought by the test. The track 18 is rotated by the driving wheels of the vehicle, the vehicle power output being measured by the power output of the dynamometer 31, operating in this instance as a generator, plus the work done on the draw bar spring, as indicated on the scale 37. The vehicle engine may be heavily loaded as in the ascension of a steep hill by increasing the electrical load on the dynamometer 31, thus resisting rotation of the track 18 through the connecting gearing 26 and 24. On the other hand the dynamometer may be operated as a motor and positively drive the track 18 at a speed greater than the speed of the vehicle 10 thus reproducing the conditions obtained when the vehicle is coasting down a hill.

As the vehicle does not move from its geographical position in the testing device, fuel, lubricating oil, water and all other necessary supplies may be readily provided while the test is in progress, so that it is convenient to drive a vehicle to destruction in this manner without stopping the test if desired. Furthermore, any desired unit of the vehicle may be tested. For example, the track 18 may be driven by the dynamometer, operating as a motor, and its rotation resisted by means of the vehicle brakes, thus providing a comprehensive test of these brakes under all possible conditions. Such phenomena as the well known shimmy may be reproduced at will, and may be closely observed even while the vehicle is being operated at high speeds.

In Fig. 4 is shown a form of the invention having a different arrangement of power measuring means. In this device each of the circular racks 24 of the track rings 17 is connected to an independent dynamometer 41 through separate spur gears 42, these gears being suitably mounted as in the bearings 43. The electrical connections and the control means of these dynamometers are such that they may be operated either independently or together. In this way a convenient means is provided whereby the transmission mechanism of the vehicle 10, and particularly the differential gearing thereof, may be tested. By loading the dynamometers 41 different amounts, the relative speed of the rings 17 may be considerably varied, or they may be made to rotate in opposite directions, thus producing any desired operation of the vehicle transmission and its final drive gearing.

It will also be seen that the track 18 in the device of this invention may be constructed of any desired diameter within the limit of the available head room in the building in which it is installed. It may therefore have a large radius of curvature so that the segment which the vehicle contacts may be quite flat, and thus more nearly produce the effect of an actual roadway. This is not possible of attainment in testing machines of the traction roller type, in which the radius of the rollers cannot exceed half the wheel base of the vehicle without interference.

The present invention is also much safer in operation, especially in the high speed testing of vehicles. In the event of a failure of the draw bar or its connections, or other inadvertent disconnection of the vehicle from its anchorage, the vehicle is confined to the track and immediately upon disconnection begins to climb a steep grade which is moving in the reverse direction. The device, therefore, not only restrains the vehicle to a closed path, but rapidly reduces its velocity.

Furthermore, it will be seen that the device occupies a relatively small amount of floor space, and it may be set up to extend through several floors of a building, for example against one of the side walls thereof, and may thus be installed in spaces which cannot be utilized for any other purpose.

It will be understood that various forms of the invention other than those described above may be used without departing from the spirit or scope of the invention.

Having thus described the invention, what is claimed and desired to be secured by Letters Patent, is:

1. In a device for testing motor vehicles, a rotatable circular track comprising axially spaced rings having inner surfaces to support the vehicle wheels and having flanges to retain said wheels, a circumferential guide rib on each ring, grooved rollers cooperating with said ribs to guide and support the rings, circumferential racks on said rings, power measuring means, and gearing connecting said means to the racks.

2. A device for testing motor vehicles comprising a circular track driven by the vehicle and including a pair of axially spaced rings to support the vehicle wheels, rollers to rotatably support said rings, guide means for the rings associated with the rollers, gear teeth forming a circumferential rack on each of the rings, gears meshing with said gear teeth, and a dynamometer connected to and driven by said gears and adapted to resist rotation thereof.

3. In a device for testing motor vehicles the combination of a circular track having an interior diameter large enough to simultaneously receive a front and a rear wheel of an automobile of normal size, means to support said circular track for rotation, and means to measure the power transmitted between said track and vehicle.

4. In a device for testing motor vehicles the combination of a circular track having an interior diameter large enough to simultaneously receive a front and a rear wheel of an automobile of normal size, means to support said circular track for rotation, means to prevent substantial bodily displacement of the vehicle, and means to measure the power transmitted between said track and vehicle.

5. In a device for testing motor vehicles the combination of a circular track having an interior diameter large enough to simultaneously receive a front and a rear wheel of an automobile of normal size, means to support said circular track for rotation, and means mounted separate from said track and connected thereto for measuring the power transmitted between said track and vehicle.

6. A device for testing motor vehicles the combination of a circular track having an interior traction surface large enough to simultaneously support a front and a rear wheel of an automobile of normal size, means for circumferentially supporting said track for rotation, and means for measuring the power transmitted between said track and vehicle.

7. In a device for testing motor vehicles, the combination of two circular tracks of a diameter larger than an automobile of normal size, means for supporting said tracks for rotation about a common axis, said tracks being spaced apart so that the wheels on one side of a vehicle may rest on the interior of one of said tracks and the wheels on the other side of the same vehicle may simultaneously rest on the interior of the other of said tracks, and means adapted to be mounted in a stationary position and connected to said tracks and arranged to measure the power transmitted between said tracks and vehicle.

8. In a device for testing motor vehicles, the combination of two circular tracks of a diameter larger than an automobile of normal size, means for supporting said tracks for rotation about a common axis, said tracks being spaced apart so that the wheels on one side of a vehicle may rest on the interior of one of said tracks and the wheels on the other side of the same vehicle may rest on the interior of the other of said tracks, gearing interconnecting said tracks, and means adapted to be mounted in a stationary position and connected to said tracks and arranged to measure the power transmitted between said tracks and vehicle.

9. In a device for testing motor vehicles, the combination of two circular tracks of a diameter larger than an automobile of normal size, means for supporting said tracks for rotation about a common axis, said tracks being spaced apart so that the wheels on one side of a vehicle may rest on the interior of one of said tracks and the wheels on the other side of the same vehicle may simultaneously rest on the interior of the other of said tracks, and two separate power measuring devices mounted in a stationary position adjacent said tracks and separately connected to said tracks to thereby independently measure the power transmitted between the wheels of the vehicle and the respective tracks.

In testimony whereof I affix my signature.

FRED V. LARKIN.